US00RE37656E

(19) United States
(12) Reissued Patent
Bahar et al.

(10) Patent Number: US RE37,656 E
(45) Date of Reissued Patent: Apr. 16, 2002

(54) ELECTRODE APPARATUS CONTAINING AN INTEGRAL COMPOSITE MEMBRANE

(75) Inventors: Bamdad Bahar, Elkton, MD (US); Robert S. Mallouk, Chadds Ford, PA (US); Alex R. Hobson, Elkton; Jeffrey A. Kolde, Baltimore, both of MD (US)

(73) Assignee: W.L. Gore & Associates, Inc., Newark, DE (US)

(21) Appl. No.: 09/325,135

(22) Filed: Jun. 3, 1999

Related U.S. Patent Documents

Reissue of:
(64) Patent No.: 5,635,041
Issued: Jun. 3, 1997
Appl. No.: 08/567,466
Filed: Dec. 5, 1995

U.S. Applications:

(62) Division of application No. 08/404,853, filed on Mar. 15, 1995, now Pat. No. 5,547,551.

(51) Int. Cl.[7] ..... C25B 13/00
(52) U.S. Cl. ..... 204/282; 204/296; 429/33; 429/41; 429/42
(58) Field of Search ..... 204/296, 282, 204/252; 429/33, 41, 42; 427/115; 428/220, 308.4, 422, 305.5, 306.6, 315.5, 311.51, 315.7, 315.9, 316.6

(56) References Cited

U.S. PATENT DOCUMENTS

| | | | | |
|---|---|---|---|---|
| 2,965,697 | A | 12/1960 | Duddy | 136/146 |
| 3,692,569 | A | 9/1972 | Grot | 117/138.845 |
| 4,218,542 | A | 8/1980 | Ukihashi et al. | 521/27 |
| 4,255,523 | A | 3/1981 | Ukihashi et al. | 521/27 |
| 4,341,615 | A | 7/1982 | Bachot et al. | 208/296 |
| 4,453,991 | A | 6/1984 | Grot | 156/94 |
| 4,469,744 | A | 9/1984 | Grot et al. | 428/246 |
| 4,518,650 | A | 5/1985 | Grot et al. | 428/286 |
| 4,604,170 | A | 8/1986 | Miyake et al. | 204/98 |
| 4,698,243 | A | 10/1987 | Carl et al. | 427/341 |
| 4,849,311 | A | 7/1989 | Itoh | 429/192 |
| 4,865,925 | A | 9/1989 | Ludwig et al. | 429/12 |
| 4,865,930 | A | 9/1989 | Kindler et al. | 429/192 |
| 4,902,308 | A | 2/1990 | Mallouk et al. | 55/16 |
| 4,954,388 | A | 9/1990 | Mallouk et al. | 428/198 |

(List continued on next page.)

FOREIGN PATENT DOCUMENTS

| | | |
|---|---|---|
| GB | 2091166 | 1/1982 |
| JP | 51-71888 | 6/1976 |
| JP | 62-240627 | 9/1987 |
| JP | 1-194927 | 8/1989 |
| JP | 6-29032 | 2/1994 |
| WO | WO 91/14021 | 9/1991 |
| WO | 95/16730 | 6/1995 |

OTHER PUBLICATIONS

"Ion Transporting Composite Membranes," Liu, et al., J. Electrochem. Soc., vol. 137, No. 2, Feb. 1990 The Electrochemical Society, Inc., pp. 510–515.

"Ion Transporting Composite Membranes", Penner, et al., Journal Electrochem Soc., vol. 132, No. 2, Feb. 1985, pp. 514–515.

"Composite Membranes for Fuel–Cell Applications," Verbrugge, et al., AIChE Journal, Jan. 1992, vol. 38, No. 1, pp. 93–100.

*Primary Examiner*—Bruce F. Bell
(74) *Attorney, Agent, or Firm*—Morgan & Finnegan, L.L.P.

(57) ABSTRACT

A composite membrane is provided which includes a base material and an ion exchange resin. The base material has a microstructure characterized by nodes interconnected by fibrils, or a microstructure characterized by fibrils with no nodes present. The ion exchange resin substantially impregnates the membrane such that the membrane is essentially air impermeable.

70 Claims, 3 Drawing Sheets

U.S. PATENT DOCUMENTS

| | | | | |
|---|---|---|---|---|
| 5,066,403 | A | | 11/1991 | Dutta ..... 210/638 |
| 5,082,472 | A | | 1/1992 | Mallouk et al. ..... 55/16 |
| 5,094,895 | A | | 3/1992 | Branca et al. ..... 428/36.91 |
| 5,183,545 | A | | 2/1993 | Branca et al. ..... 204/252 |
| 5,190,813 | A | | 3/1993 | Ohashi ..... 428/319.3 |
| 5,256,503 | A | | 10/1993 | Cook et al. ..... 429/249 |
| 5,288,384 | A | | 2/1994 | Banerjee ..... 204/252 |
| 5,356,663 | A | | 10/1994 | Perusich et al. ..... 427/140 |
| 5,415,888 | A | | 5/1995 | Banerjee et al. ..... 427/125 |
| 5,425,865 | A | | 6/1995 | Singleton et al. ..... 204/252 |
| 5,472,799 | A | | 12/1995 | Watanabe ..... 429/30 |
| 5,523,181 | A | | 6/1996 | Stonehart ..... 429/192 |
| 5,545,475 | A | | 8/1996 | Korleski ..... 428/306.6 |
| 5,547,551 | A | * | 8/1996 | Bahar et al. ..... 204/296 |
| 5,597,659 | A | | 1/1997 | Morigaki et al. ..... 429/190 |
| 5,766,787 | A | | 6/1998 | Watanabe et al. ..... 429/33 |
| 5,795,668 | A | | 8/1998 | Banerjee ..... 429/33 |

* cited by examiner

ELECTRODE APPARATUS CONTAINING AN INTEGRAL COMPOSITE MEMBRANE

Matter enclosed in heavy brackets [ ] appears in the original patent but forms no part of this reissue specification; matter printed in italics indicates the additions made by reissue.

This is a divisional of application Ser. No. 08/404,853, filed on Mar. 15, 1995, now U.S. Pat. No. 5,547,551.

FIELD OF THE INVENTION

An electrode apparatus containing an integral composite membrane is provided which is useful in electrolytic processes and other chemical separations.

BACKGROUND OF THE INVENTION

Ion exchange membranes (IEM) are used in polymer electrolyte fuel cells as solid electrolytes. A membrane located between a cathode and an anode of such a fuel cell, transpods protons formed near the catalyst at the hydrogen electrode to the oxygen electrode, thereby allowing a current to be drawn from the fuel cell. These polymer electrolyte fuel cells are particularly advantageous because they operate at lower temperatures than other fuel cells. Also, these polymer electrolyte fuel cells do not contain any corrosive acids which are found in phosphoric acid fuel cells. In these type fuel cells, there is a need to eliminate the bulk transfer of reactants from one electrode to the other, i.e. fluid percolation.

Ion exchange membranes are also used in chloralkali applications to separate brine mixtures to form chlorine gas and sodium hydroxide. For best performance, it is preferred that the membrane selectively transport the sodium ions across the membrane while rejecting the chloride ions. Also, the ion exchange membrane must eliminate bulk transfer of electrolytic solution across the membrane, i.e. fluid percolation.

Additionally, IEMs are useful in the areas of diffusion dialysis, electrodialysis and in pervaporation and vapor permeation separations. IEMs may also be used for selective transpod of polar compounds from mixtures containing both polar and non-polar compounds.

IEMs must have sufficient strength to be useful in their various applications. Often, this need for increased strength requires that an IEM be made relatively thick in cross section, or that the IEM be reinforced with woven fabrics (macro-reinforcements), both of which decreases the ionic conductance of the IEM. Additionally, conventional IEMs exhibit inherent dimensional instability due to the absorbance of solvents, such as water, for example. Such dimensional instability renders conventional IEMs substantially ineffective for many commercial applications.

U.S. Pat. No. 3,692,569 relates to the use of a coating of a copolymer of fluorinated ethylene and a sulfonyl-containing fluorinated vinyl monomer on a fluorocarbon polymer that was previously non-wettable. The fluorocarbon polymer may include tetrafluoroethylene polymers. This coating provides a topical treatment to the surface so as to decrease the surface tension of the fluorocarbon polymer. U.S. Pat. No. 3,692,569 provides for a fluid percolating structure.

U.S. Pat. No. 4,453,991 relates to a process for making articles coated with a liquid composition of a perfluorinated polymer, having sulfonic acid or sulfonate groups in a liquid medium, by contacting the polymer with a mixture of 25 to 100% by weight of water and 0 to 75% by weight of a second liquid component, such as a low molecular weight alcohol, in a closed system. Such a process provides for a multi-layered structure.

U.S. Pat. No. 4,902,308 relates to a film of porous expanded polytetrafluoroethylene (PTFE) having its surfaces, both exterior and internal, coated with a metal salt of perfluoro-cation exchange polymer. Such a composite product is permeable to air. The air flow of such a structure, as measured by the Gurley densometer ATSM D726-58, is about 12 to 22 seconds. Therefore, this structure provides for fluid percolation.

U.S. Pat. No. 5,082,472 relates to a composite material of a microporous membrane, such as porous expanded PTFE, in laminar contact with a continuous ion exchange resin layer, wherein both layers have similar area dimensions. Surfaces of internal nodes and fibrils of the expanded PTFE may be coated, at least in part, with an ion exchange resin coating. The expanded PTFE layer of this composite membrane imparts mechanical strength to the composite structure. However, the interior of the expanded PTFE membrane is untilled so as to not block the flow of fluids. Therefore, U.S. Pat. No. 5,082,472 provides for fluid percolation.

U.S. Pat. Nos. 5,094,895 and 5,183,545 relate to a composite porous liquid-permeable article having multiple layers of porous expanded PTFE, which are bonded together, and which have interior and exterior surfaces coated with an ion exchange polymer. Such a composite article is particularly useful as a diaphragm in electrolytic cells. However, diaphragms are inherently percolating structures. Japanese Patent Application No. 62-240627 relates to a coated or an impregnated membrane formed with a perfluoro type ion exchange resin and a porous PTFE film to form an integral structure. The resulting composite is not fully occlusive. Furthermore, the teachings of this application do not provide for permanent adhesion of the ion exchange resin to the inside surface of the PTFE film.

There remains a need for a strong, integral composite ion exchange membrane, having long term chemical and mechanical stability.

SUMMARY OF THE INVENTION

The present invention is an advancement over presently known ion exchange membranes. In one embodiment of the present invention, this is accomplished by providing a composite membrane comprising an expanded polytetrafluoroethylene (PTFE) membrane having a porous microstructure of polymeric fibrils. The composite membrane is impregnated with an ion exchange material throughout the membrane. The impregnated expanded polytetrafluoroethylene membrane has a Gurley number of greater than 10,000 seconds. The ion exchange material substantially impregnates the membrane so as to render an interior volume of the membrane substantially occlusive.

The expanded PTFE membrane may comprise a microstructure of nodes interconnected by fibrils.

The ion exchange material may be selected from a group consisting of perfluorinated sulfonic acid resin, perfluorinated carboxylic acid resin, polyvinyl alcohol, divinyl benzene, styrene-based polymers, and metal salts with or without a polymer. The ion exchange material may also be comprised of at least in part a powder, such as but not limited to, carbon black, graphite, nickel, silica, titanium dioxide, and platinum black.

A purpose of the present invention is to provide an improved alternative to the macro-reinforcement of ionomer materials.

Another purpose of the present invention is to provide an ion exchange membrane having a single integral structure that does not allow for fluid percolation.

The foregoing and other aspects will become apparent from the following detailed description of the invention when considered in conjunction with the accompanying drawing figures.

DETAILED DESCRIPTION OF THE INVENTION

Figure 1:
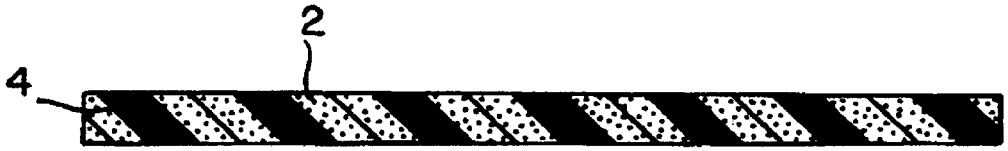
FIG. 1 is a schematic cross-section of a composite membrane of the present invention that is fully impregnated with an ion exchange material.
Figure 5:
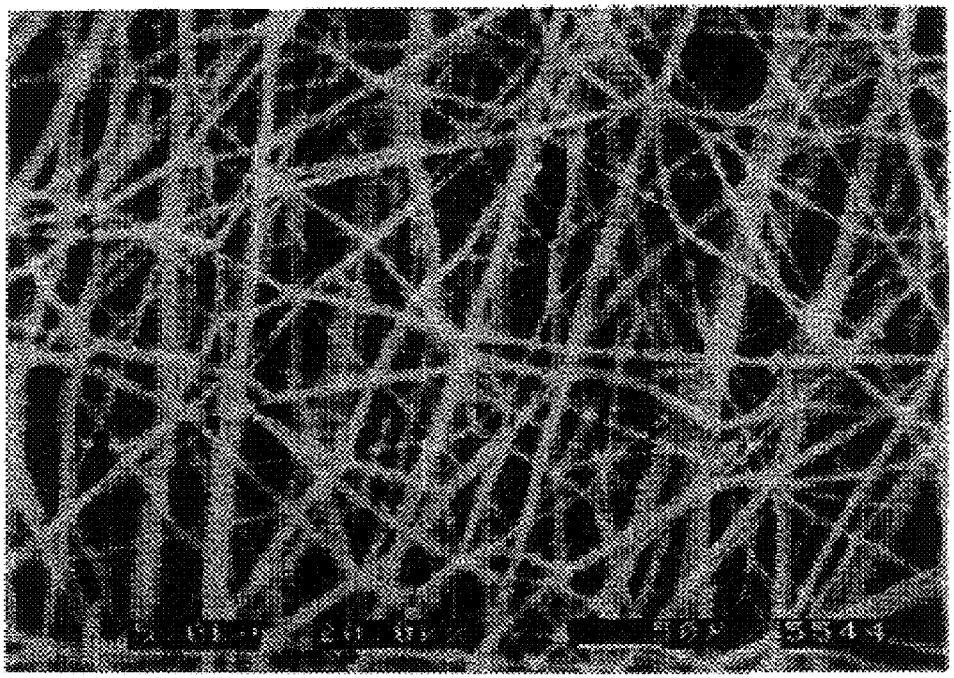
FIG. 5 is a photomicrograph, at a magnification of 20.0 kx, of a cross-section of an expanded PTFE membrane, comprised substantially of fibrils with no nodes present, which has not been treated with an ion exchange material.

As best illustrated by FIG. 1, a composite membrane is provided which includes a base material 4 and an ion exchange material or ion exchange resin 2. The base material 4 is a membrane which is defined by a porous microstructure characterized by nodes interconnected by fibrils (FIG. 3), or a porous microstructure characterized substantially by fibrils (FIG. 5). The ion exchange resin substantially impregnates the membrane so as to render the interior volume substantially occlusive. The ion exchange resin is securely adhered to both the external and internal membrane surfaces, i.e. the fibrils and/or nodes of the base material.

The composite membrane of the present invention may be employed in various applications, including but not limited to, polarity-based chemical separations; electrolysis; fuel cells and batteries; pervaporation; gas separation; dialysis separation; industrial electrochemistry, such as chloralkali production and other electrochemical applications; use as a super acid catalyst; or use as a medium in enzyme immobilization, for example.

The composite membrane of the present invention is uniform and mechanically strong. As used herein, the term "uniform" is defined as continuous impregnation with the ion exchange material such that no pin holes or other discontinuities exist within the composite structure. The membrane should be "occlusive", meaning that the interior volume of the porous membrane is impregnated such that the interior volume is filled with the ion exchange material and the final membrane is essentially air impermeable having a Gurley number of greater than 10,000 seconds. A fill of 90% or more of the interior volume of the membrane should provide adequate occlusion for purposes of the present invention.

Figure 3:
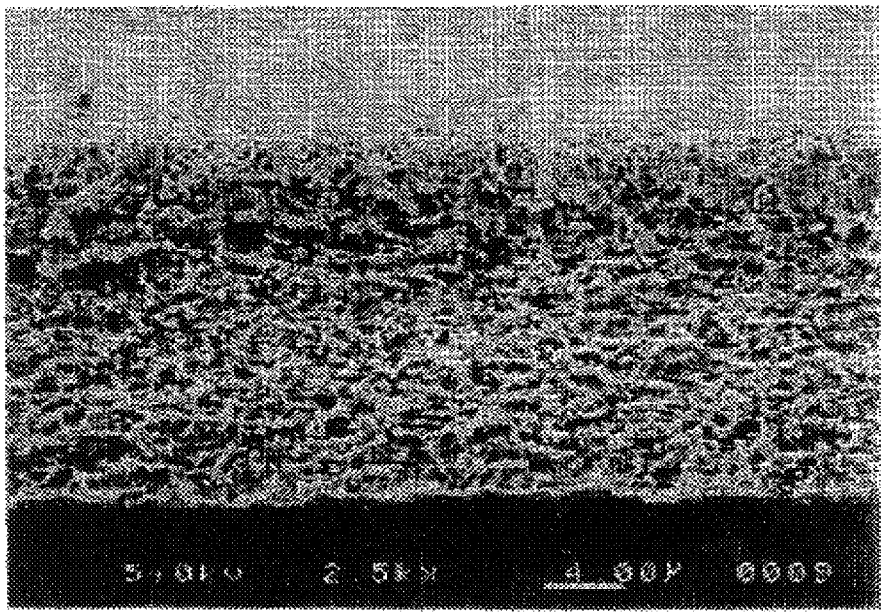
FIG. 3 is a photomicrograph, at a magnification of 2.5 kX, of a cross-section of an expanded PTFE membrane that has not been treated with an ion exchange material.

A preferred base material 4 is an expanded polytetrafluoroethylene (ePTFE) which may be made in accordance with the teachings of U.S. Pat. No. 3,593,566, incorporated herein by reference. Such a base material has a porosity of greater than 35%. Preferably, the porosity is between 70–95%. Preferably the thickness is between 0.06 mils (0.19 $\mu$m) and 0.8 mils (0.02 mm), and most preferably the thickness is between 0.50 mils (0.013 mm) and 0.75 mils (0.019 mm). This material is commercially available in a variety of forms from W. L. Gore & Associates, Inc., of Elkton, Md., under the trademark GORE-TEX®, FIG. 3 shows a photomicrograph of the internal porous microstructure of an embodiment of such an expanded PTFE membrane. As seen therein, the porous microstructure comprises nodes interconnected by fibrils which define an interior volume of the base material 4. Alternatively, the base material 4 may comprise an ePTFE material having a porous microstructure defined substantially of fibrils with no nodes present.

To manufacture an ePTFE membrane having a porous microstructure defined substantially of fibrils with no nodes present, a PTFE that has a low amorphous content and a degree of crystallization of at least 98% is used as the raw material. More particularly, a coagulated dispersion or fine powder PTFE may be employed, such as but not limited to FLUON® CD-123 and FLUON® CD-1 available from ICI Americas, Inc., or TEFLON® fine powders available from E. I. DuPont de Nemours and Co., Inc. (TEFLON is a registered trademark of E. I. DuPont de Nemours and Co., Inc.) These coagulated dispersion powders are lubricated with a hydrocarbon extrusion aid, preferably an odorless mineral spirit, such as ISOPAR K (made by Exxon Corp.) (ISOPAR is a registered trademark of the Exxon Corporation). The lubricated powder is compressed into cylinders and extruded in a ram extruder to form a tape. The tape is compressed between rolls to an appropriate thickness, usually 5 to 10 mils. The wet tape is stretched traversely to 1.5 to 5 times its original width. The extrusion aid is driven off with heat. The dried tape is then expanded longitudinally between banks of rolls in a space heated to a temperature that is below the polymer melting point (approximately 327° C.). The longitudinal expansion is such that the ratio of speed of the second bank of rolls to the first bank is from about 10–100 to 1. The longitudinal expansion is repeated at about 1–1.5 to 1 ratio. After the longitudinal expansion, the tape is expanded traversely, at a temperature that is less than about 327° C., to at least 1.5 times, and preferably to 6 to 15 times, the width of the original extrudate, while restraining the membrane from longitudinal contraction. While still under constraint, the membrane is preferably heated to above the polymer melting point (approximately 342° C.) and then cooled. This ePTFE membrane is characterized by the following properties:

(a) average pore size between 0.05 and 0.4 micrometers, and preferably less than 0.2;

(b) a bubble point between 10 and 60 psi;

(c) a pore size distribution value between 1.05 and 1.20;

(d) a ball burst strength between 0.9 and 17 pounds/force;

(e) an air flow of between 20 Frazier and 10 Gurley seconds;

(f) a thickness between 1.32 $\mu$m and 25.4 $\mu$m; and (g) a fiber diameter of between 5 and 20 Nm.

Suitable ion exchange materials 2 include, but are not limited to, perfluorinated sulfonic acid resin, perfluorinated carboxylic acid resin, polyvinyl alcohol, divinyl benzene, styrene-based polymers and metal salts with or without a polymer. A mixture of these ion exchange materials may also be employed in treating the membrane 4. Solvents that are suitable for use with the ion exchange material, include for example, alcohols, carbonates, THF (tetrahydrofuran), water, and combinations thereof. Optionally, ion exchange materials may be complemented by finely divided powders or other (non-ionic) polymers to provide final composites. Such a finely divided powder may be selected from a wide range of organic and inorganic compounds such as, but not limited to, carbon black, graphite, nickel, silica, titanium dioxide, platinum black, for example, to provide specific added effects such as different aesthetic appearance (color), electrical conductivity, thermal conductivity, catalytic effects, or enhanced or reduced reactant transport properties. Examples of non-ionic polymers include, but are not limited to, polyolefins, other fluoropolymers such as polyvinylidene (PVDF), or other thermoplastics and thermoset resins. Such non-ionic polymers may be added to aid occlusion of the substrate matrix, or to enhance or reduce reactant transport properties.

A surfactant having a molecular weight of greater than 100 is preferably employed with the ion exchange material 2 to ensure impregnation of the interior volume of the base material 4. Surfactants or surface active agents having a hydrophobic portion and a hydrophilic portion may be utilized.

A most preferred surfactant is a nonionic material, octylphenoxy polyethoxyethanol having a chemical structure:

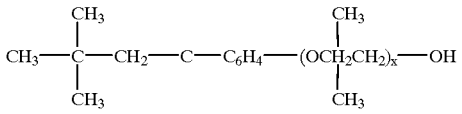

where x=10 (average),
and is known as Triton X-100, which is commercially available from Rohm & Haas of Philadelphia, Pa.

Figure 4:
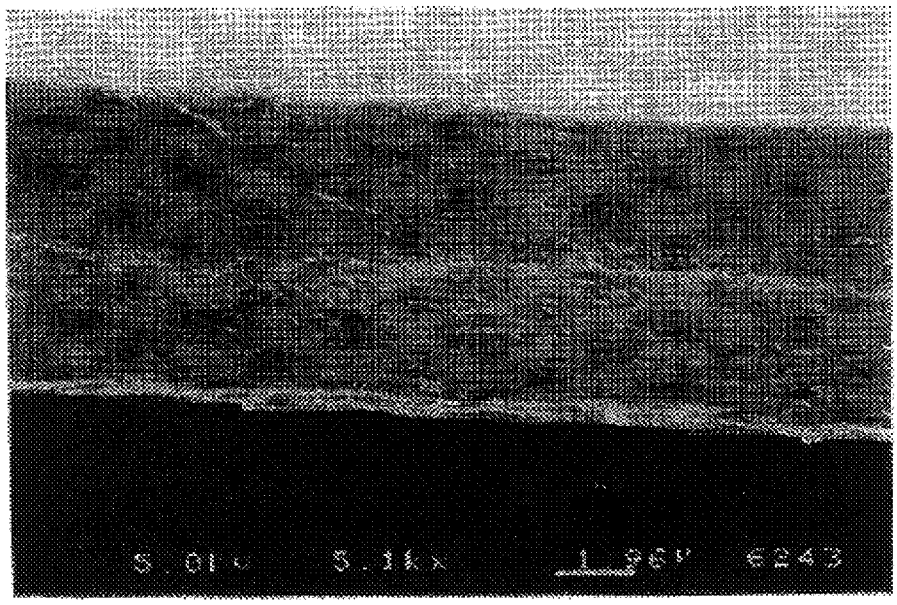
FIG. 4 is a photomicrograph, at a magnification of 5.1 kX, of a cross-section of an expanded PTFE membrane impregnated with an ion exchange material, such that the interior volume of the membrane is substantially occluded.

As best seen by reference to FIG. 4, the final composite membrane of the present invention has a uniform thickness free of any discontinuities or pinholes on the surface. The interior volume of the membrane is occluded such that the composite membrane is impermeable to non-polar gases and to bulk flow of liquids.

Figure 2:
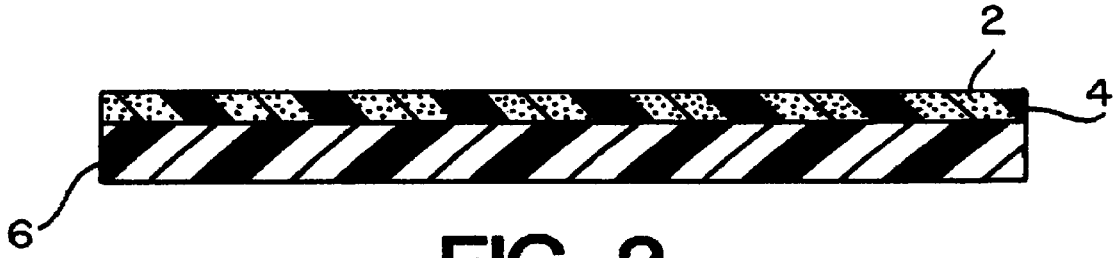
FIG. 2 is a schematic cross-section of the composite membrane of the present invention that is fully impregnated with an ion exchange material and which includes a backing material attached thereto.

Optionally, and as shown schematically in FIG. 2, the composite membrane may be reinforced with a woven or non-woven material 6 bonded to one side of the base material 4. Suitable woven materials may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials may include, for example, a spun-bonded polypropylene from Reemay Inc. of Old Hickory, Tenn.

The treated membrane may be further processed to remove any surfactant which may have been employed in processing the base material as described in detail herein. This is accomplished by soaking or submerging the membrane in a solution of, for example, water, isopropyl alcohol, hydrogen peroxide, methanol, and/or glycerin. During this step, the surfactant, which was originally mixed in solution with the ion exchange material, is removed. This soaking or submerging causes a slight swelling of the membrane, however the ion exchange material remains within the interior volume of the base material 4.

The membrane is further treated by boiling in a suitable swelling agent, preferably water, causing the membrane to slightly swell in the x and y direction. Additional swelling occurs in the z-direction. A composite membrane results having a higher ion transport rate that is also strong. The swollen membrane retains its mechanical integrity and dimensional stability, unlike the membranes consisting only of the ion exchange material. Also, the membrane maintains desired ionic transport characteristics. A correlation exists between the content of the swelling agent within the membrane structure and transport properties of the membrane. A swollen membrane will transport chemical species faster than an unswollen membrane.

Although the membrane has excellent long term chemical stability, it can be susceptible to poisoning by organics. Accordingly, it is often desirable to remove such organics from the membrane. For example, organics can be removed by regeneration in which the membrane is boiled in a strong acid, such as nitric or chromic acid.

To prepare the integral composite membrane of the present invention, a support structure, such as a polypropylene woven fabric, may first be laminated to the untreated base material 4 by any conventional technique, such as, hot roll lamination, ultrasonic lamination, adhesive lamination, or forced hot air lamination so long as the technique does not damage the integrity of the base material. A solution is prepared containing an ion exchange material in solvent mixed with one or more surfactants. The solution may be applied to the base material 4 by any conventional coating technique including forwarding roll coating, reverse roll coating, gravure coating, doctor coating, kiss coating, as well as dipping, brushing, painting, and spraying so long as the liquid solution is able to penetrate the interstices and interior volume of the base material. Excess solution from the surface of the membrane may be removed. The treated membrane is then immediately placed into an oven to dry. Oven temperatures may range from 60°–200° C., but preferably 120°–160° C. Drying the treated membrane in the oven causes the ion exchange resin to become securely adhered to both the external and internal membrane surfaces, i.e., the fibrils and/or nodes of the base material. Additional solution application steps, and subsequent drying, may be repeated until the membrane becomes completely transparent. Typically, between 2 to 8 treatments are required, but the actual number of treatments is dependent on the surfactant concentration and thickness of the membrane. If the membrane is prepared without a support structure, both sides of the membrane may be treated simultaneously thereby reducing the number of treatments required.

The oven treated membrane is then soaked in a solvent, such as the type described hereinabove, to remove the surfactant. Thereafter the membrane is boiled in a swelling agent and under a pressure ranging from about 1 to about 20 atmospheres absolute thereby increasing the amount of swelling agent the treated membrane is capable of holding.

Alternatively, the ion exchange material may be applied to the membrane without the use of a surfactant. This procedure requires additional treatment with the ion exchange resin. However, this procedure does not required that the oven treated membrane be soaked in a solvent, thereby reducing the total number of process steps. A vacuum may also be used to draw the ion exchange material into the membrane. Treatment without surfactant is made easier if the water content of the solution is lowered. Partial solution dewatering is accomplished by slow partial evaporation of the ion exchange material solution at room temperature followed by the addition of a nonaqueous solvent. Ideally, a fully dewatered solution can be used. This is accomplished in several steps. First, the ion exchange material is completely dried at room temperature. The resulting resin is ground to a fine powder. Finally, this powder is redissolved in a solvent, preferably a combination of methanol and isopropanol.

Because the composite membrane of the present invention can be made thinner than a fabric or non-woven reinforced structure, it is possible to transport ions at a faster rate than previously has been achieved, with only a slight lowering of the selectivity characteristics of the membrane.

The following testing procedures were employed on samples which were prepared in accordance with the teachings of the present invention.

TEST PROCEDURES

TENSILE TEST

Tensile tests were carried out on an Instron Model 1122 tensile strength tester, in accordance with ASTM D 638-91. Machine parameters were set as follows:

Cross head speed: 0.423 cm/sec.

Full Scale load range: 222.4N

Humidity (%): 50

Temperature: 22.8° C.

Grip Distance: 6.35 cm

Specimens were stamped out to conform with Type (II) of ASTM D638. The specimens had a width of 0.635 cm, and a gauge length of 2.54 cm.

THICKNESS

Thickness of the base material was determined with the use of a snap gauge (Johannes Kafer Co. Model No. F1000/302). Measurements were taken in at least four areas of each specimen. Thickness of the dried composite membrane was also obtained with the use of the snap gauge. Thicknesses of swollen samples were not measurable with the snap gauge due to the compression or residual water on the surface of the swollen membrane. Thickness measurements of the swollen membranes were also not able to be obtained with the use of scanning electron microscopy due to interferences with the swelling agents.

MOISTURE VAPOR TRANSMISSION RATE (MVTR)

A potassium acetate solution, having a paste like consistency, was prepared from potassium acetate and distilled water. (Such a paste may be obtained by combining 230 g potassium acetate with 100 g of water, for example.) This solution was placed into a 133 ml. polypropylene cup, having an inside diameter of 6.5 cm, at its mouth. An expanded polytetrafluoroethylene (ePTFE) membrane was provided having a minimum MVTR of approximately 85,000 $g/m^{2-}24$ hr. as tested by the method described in Crosby U.S. Pat. No. 4,862,730. The ePTFE was heat sealed to the lip of the cup to create a taut, leakproof, microporous barrier containing the solution.

A similar ePTFE membrane was mounted to the surface of a water bath. The water bath assembly was controlled at 23° C.±plus or minus 0.2° C., utilizing a temperature controlled room and a water circulating bath.

Prior to performing the MVTR test procedure, a sample to be tested was allowed to condition at a temperature of 23° C. and a relative humidity of 50%. The sample to be tested was placed directly on the ePTFE membrane mounted to the surface of the water bath and allowed to equilibrate for 15 minutes prior to the introduction of the cup assembly.

The cup assembly was weighed to the nearest 1/1000 g. and was placed in an inverted manner onto the center of the test sample.

Water transport was provided by a driving force defined by the difference in relative humidity existing between the water in the water bath and the saturated salt solution of the inverted cup assembly. The sample was tested for 10 minutes and the cup assembly was then removed and weighed again within 1/1000 g.

The MVTR of the sample was calculated from the weight gain of the cup assembly and was expressed in grams of water per square meter of sample surface area per 24 hours.

PEEL STRENGTH

Peel strength or membrane adhesion strength tests were conducted on membrane samples prepared with reinforced backings. Test samples were prepared having dimensions of 3 inches by 3.5 inches (7.62 cm×8.89 cm). Double coated vinyl tape (type—#419 available from the 3M Company of Saint Paul, Minn.) having a width of 1 inch (2.54 cm) was placed over the edges of a 4 inch by 4 inch (10.2 cm×10.2 cm.) chrome steel plate so that tape covered all edges of the plate. The membrane sample was then mounted on top of the adhesive exposed side of the tape and pressure was applied so that sample was adhesively secured to the chrome plate.

The plate and sample were then installed, in a horizontal position, within an Instron tensile test machine Model No. 1000. An upper crosshead of the tensile test machine was lowered so that the jaws of the test machine closed flat and tightly upon the sample. The upper crosshead was then slowly raised pulling the membrane sample from the reinforced backing. When the membrane detached from the reinforced backing, the test was complete. Adhesion strength was estimated from the average strength needed to pull the membrane from the reinforced backing.

IONIC CONDUCTANCE

The ionic conductance of the membrane was tested using a Palico 9100-2 type test system. This test system consisted of a bath of 1 molar sulfuric acid maintained at a constant temperature of 25° C. Submerged in the bath were four probes used for imposing current and measuring voltage by a standard "Kelvin" four-terminal measurement technique. A device capable of holding a separator, such as the sample membrane to be tested, was located between the probes. First, a square wave current signal was introduced into the bath, without a separator in place, and the resulting square wave voltage was measured. This provided an indication of the resistance of the acid bath. The sample membrane was then placed in the membrane-holding device, and a second square wave current signal was introduced into the bath. The resulting square wave voltage was measured between the probes. This was a measurement of the resistance due to the membrane and the bath. By subtracting this number from the first, the resistance due to the membrane alone was found.

DIMENSIONAL STABILITY

Reverse expansion in the x and y direction upon dehydration was measured using a type Thermomechanical Analyzer 2940, made by TA Instruments, Inc., of New Castle, Del. This instrument was used to apply a predetermined force to a sample that had been boiled in water for 30 minutes. A quartz probe placed in contact with the sample measured any linear changes in the sample as it dried. A sample was placed in a holder and then dried at 75° C. for greater than 10 min. The change in dimension (i.e., the shrinkage) was recorded as a percentage of the original weight.

WEIGHT LOSS WITH TEMPERATURE

A high resolution TGA 2950, Thermogravimetric Analyzer, made by TA Instruments (Newcastle, Del.) was used to determine the weight loss of samples with respect to temperature. This weight loss is an indication of the water content of the ionomer sample.

SELECTIVITY

Two solutions of KCI, having concentrations of 1 molar and 0.5 molar, respectively, were separated using the membranes of the present invention. Two calomel reference electrodes (available from Fischer Scientific, Pittsburgh Pa., catalog number 13-620-52) were placed in each solution, and the potential difference across the membranes was recorded using a digital multimeter (available from Hewlett Packard, Englewood Calif., catalog number HP34401A). The values obtained correspond to the difference of chloride ion activity across the membrane and are reduced by the rate of anion migration across the membranes. Therefore the obtained values provide an indication of the membrane selectivity. The higher the measured voltage, the better the membrane selectivity.

BUBBLE POINT TEST

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point was measured according to the procedures of ASTM F316-86. Isopropyl alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

PORE SIZE AND PORE SIZE DISTRIBUTION

Pore size measurements are made by the Coulter Porometer™, manufactured by Coulter Electronics, Inc., Hialeah, Fla. The Coulter Poremeter is an instrument that provides automated measurement of pore size distributions in porous media using the liquid displacement method (described in ASTM Standard E1298-89). The Poremeter determines the pore size distribution of a sample by increasing air pressure on the sample and measuring the resulting flow. This distribution is a measure of the degree of uniformity of the membrane (i.e., a narrow distribution means there is little difference between the smallest and largest pore size). The Porometer also calculates the mean flow pore size. By definition, half of the fluid flow through the filter occurs through pores that are above or below this size. It is the mean flow pore size which is most often linked to other filter properties, such as retention of particulates in a liquid stream. The maximum pore size is often linked to the Bubble Point because bulk air flow is first seen through the largest pore.

BALL BURST TEST

This text measures the relative strength of a sample by determining the maximum load at break. The sample is challenged with a 1 inch diameter ball while being clamped between two plates. The material is placed taut in the measuring device and pressure applied with the ball burst probe. Pressure at break is recorded.

AIR FLOW DATA

The Gurley air flow test measures the time in seconds for 100 cc of air to flow through a one square inch sample at 4.88 inches of water pressure. The sample is measured in a Gurley Densometer (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number.

The Frazier air flow test is similar but is mostly used for much thinner or open membranes. The test reports flow in cubic feet per minute per square foot of material at 0.5 inches water pressure. Air flow can also be measured with the Coulter Porometer. In this test, the operator can select any pressure over a wide range. The Porometer can also perform a pressure hold test that measures air flow during a decreasing pressure curve.

BACKGROUND OF EXAMPLES

As may be appreciated by one skilled in the art, the present invention provides for an integral composite membrane. No porous surfaces are exposed in the present invention.

The integral composite membrane of the present invention can be advantageously employed in electrolytic processes and chemical separations. In a plate-and-frame type electrodialysis unit, the membrane of the present invention would take the place of existing cation exchange membranes. This membrane could be of the type which is laminated to a spacer screen in accordance with a specific application. Due to the higher conductance of this membrane feasible with thinner membranes, an electrodialysis unit could employ less membrane to achieve a given flux rate, thereby saving space and cost. If equipment is retrofitted with this membrane, the voltage requirements would be reduced at a given current, or higher current could be run at a given voltage. Also, in a diffusion dialysis system, a given unit employing the membrane of the present invention would provide a higher flux.

A fuel cell, utilizing the membrane of the present invention, operates at a higher voltage for a given current density due to the improved ionic conductance of thinner versions of the membrane of this invention.

Due to improved water transport across the membrane of the present invention, high limiting current may be achieved with less fuel gas humidification, as compared to membranes which have been employed heretofore. For example, the membrane of the present invention has a resistance of 0.044 ohm-sq cm. At a current density of 1 A/cm$^2$, this causes a voltage drop of about 44 mV, or about a 99 mV improvement in cell voltage compared to NAFION 117 membranes which have a resistance of 0.143 $\Omega$-cm$^3$. (NAFION is a registered trademark of E. I. DuPont de Nemours and Co., Inc.). As used herein, NAFION 117 means a membrane having a thickness of 7 mils made from perfluorosulfonic acid/tetrafluoroethylene (TFE)/copolymer. This may reduce losses by about 99 mW/sq cm at this operating condition for resistance. If the cell operating voltage increased from 500 mV to 599 mV, the cell voltage efficiency would increase from 41% to 49% of the theoretical 1.23 V. The decrease in the internal resistance of the cell allows the design of smaller or more efficient cells.

Without intending to limit the scope of the present invention, the apparatus and method of production of the present invention may be better understood by referring to the following examples. All samples of ePTFE provided in the following examples were made in accordance with the teachings of U.S. Pat. No. 3,593,566. More particularly, the ePTFE had the following material properties:

| | TYPE 1 | TYPE 2 |
|---|---|---|
| Gurley (sec.) | 3.3 | 0.9 |
| Bubble Point (psi) | 28.3 | 32.6 |
| Mass/Area (g/m$^2$) | 6.1 | 4.4 |
| Density (g/cc) | 0.65 | 0.77 |
| Longitudinal Maximum Load (lbs.) | 1.76 | 2.18 |
| Transverse Maximum Load (lbs.) | 2.33 | 1.31 |

As may be appreciated by one skilled in the art, ePTFE membranes can be made with a wide range of physical property values, with ranges far exceeding the two examples given above.

Example 1

A TYPE 1 ePTFE membrane, having a nominal thickness of 0.75 mils (0.02 mm), was mounted on a 6 inch diameter wooden embroidery hoop. An ion exchange material/surfactant solution was prepared comprising 95% by volume of a perfluorosulfonic acid/tetrafluoroethylene copolymer resin solution (in H+ form, which itself is comprised of 5% perfluorosulfonic acid/tetrafluoroethylene copolymer resin, 45% water, and 50% a mixture of low molecular weight alcohols, commercially available from E.I. DuPont de Nemours, Inc. under the registered trademark NAFION® type NR-50 (1100 EW) hereinafter "NR-50") and 5% of a nonionic surfactant of octylphenoxy polyethoxyethanol (Triton X-100, commercially available from Rohm & Haas of Philadelphia, Pa.). This solution was brushed on both sides of the membrane to impregnate and substantially occlude the interior volume of the membrane. The sample was then dried in the oven at 140° C. for 30 seconds. The procedure was repeated two more times to fully occlude the interior volume. The sample was then soaked in isopropanol for 5 minutes to remove the surfactant. After rinsing with distilled water and allowing the sample to dry at room temperature, a final coat of the ion exchange material/surfactant solution was applied. The wet membrane was again dried in the oven at 140° C. for 30 seconds and soaked in isopropanol for 2 minutes. The membrane was finally boiled in distilled water for 30 minutes under atmospheric pressure to swell the treated membrane. Gurley numbers for this material are summarized in Table 3. Ionic conductive rates are summarized in Table 4. The tensile strength may be found in Table 2. Percent weight change of this sample may be found in Table 6. The swollen membrane was later dried to a dehydrated state in an oven at 140° C. for 30 seconds. The thickness of the dried composite membrane was measured and found to be approximately the same thickness as the base material.

Example 2

A TYPE 1 ePTFE membrane, having a nominal thickness of 0.75 mils (0.02 mm) and a Gurley Densometer air flow of 2–4 seconds, was placed on top of a netting of polypropylene obtained from Conwed Plastics Corp. of Minneapolis, Minn. The two materials were bonded together on a laminator with 10 psig pressure, a speed of 15 feet per minute and a temperature of 200° C. No adhesives were used. The reinforced membrane sample was then placed on a 6 inch wooden embroidery hoop. A solution was prepared of 96% by volume of a perfluorosulfonic acid/TFE copolymer resin in alcohol, and 4% of the nonionic surfactant Triton X-100. This solution was brushed only on the membrane side to substantially occlude the interior volume of the membrane. The sample was dried in an oven at 130° C. This procedure was repeated three more times to fully occlude the interior volume of the membrane. The sample was then baked in an oven at 140° C. for 5 minutes. The sample was soaked in isopropanol for 5 minutes to remove the surfactant. The membrane was then boiled in distilled water for 30 minutes under atmospheric pressure causing the treated membrane to swell. Gurley numbers for this material are summarized in Table 3.

This sample was tested for its peel strength in accordance with the method described above. The linear bond strength was found to be 2.06 lb./sq. in. (1450 kg/m$^2$).

Example 3

A TYPE 2 ePTFE membrane, having a thickness of 0.5 mils (0.01 mm), was mounted on a 6 inch diameter wooden embroidery hoop. A solution of 100% by volume of NR-50 was brushed onto both sides of the membrane, without the addition of any surfactants, to substantially occlude the interior volume of the membrane. The sample was then placed in an oven at 140° C. to dry. This procedure was repeated four more times until the membrane was completely transparent and the interior volume of the membrane was fully occluded. The sample was then boiled in distilled water for 30 minutes at atmospheric pressure causing the membrane to swell. Gurley numbers for this material are summarized in Table 3.

Example 4

A TYPE 2 ePTFE membrane, having a thickness of 0.5 mils (0.01 mm), was mounted onto a 6 inch diameter wooden embroidery hoop. A solution was prepared of 95% by volume NR-50 and 5% of the nonionic surfactant, Triton X-100. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the solution was applied. The wet membrane was dried in the oven at 140° C. for 30 seconds, and then soaked in isopropanol for 2 minutes. Finally, the membrane was boiled in distilled water for 5 minutes. Moisture vapor transmission rates for the treated membrane were measured and are summarized in Table 1.

Example 5

A TYPE 1 ePTFE membrane, having a nominal thickness of 0.75 mils (0.02 mm), was mounted onto a 6 inch diameter wooden embroidery hoop. The Gurley Densometer air flow for this membrane was 2–4 seconds. A solution was prepared of 95% by volume NR-50 and 5% Triton X-100. The solution was brushed on both sides of the membrane with a foam brush and the excess was wiped off. The wet membrane was dried in the oven at 140° C. for 30 seconds. Three additional coats of solution were applied in the same manner. The membrane was then soaked in isopropanol for 2 minutes. After rinsing with distilled water and allowing to dry at room temperature, a final coat of the solution was applied. The wet membrane was dried in the oven at 140° C. for 30 seconds, then soaked in isopropanol for 2 minutes. This material was not boiled. No swelling other than the minor swelling during the surfactant removal occurred. The ionic conduction rate for this material is presented in Table 4.

Example 6

A TYPE 1 ePTFE membrane, having a nominal thickness of 0.75 mils (0.02 mm), was mounted onto a 5 inch diameter plastic embroidery hoop. The Gurley Densometer air flow for this membrane was 2–4 seconds. A solution was prepared of 95% NR-50 and 5% Triton X-100. The solution was brushed on both sides of the membrane with a foam brush and the excess was wiped off. The wet membrane was dried in the oven at 140° C. for 30 seconds. Two additional coats of solution were applied in the same manner to fully occlude the interior volume of the membrane. The membrane was then soaked in isopropanol for 2 minutes. After rinsing with distilled water and allowing to dry at room temperature, a final coat of the solution was applied. The wet membrane was dried in the oven at 140° C. for 30 seconds, and then soaked in isopropanol for 2 minutes to remove the surfactant. The sample was rinsed and dried at room temperature.

This sample was weighed before it was mounted on the 5 inch plastic hoop. Following treatment, it was removed from the hoop and weighed again. The ion exchange polymer content was directly calculated by determining the weight change before and after treatment. The ion exchange content for this sample was found to be 98.4 mg or 7.77 grams per square meter of membrane.

Example 7

A TYPE 1 ePTFE membrane, having a nominal thickness of 0.75 mils (0.02 mm) and a Gurley Densometer air flow of 2–4 seconds, was placed on top of a netting of polypropylene which was obtained from Applied Extrusion Technologies, Inc. of Middletown, Del. The two materials were bonded together on a laminator with 10 psig pressure, a speed of 15 feet per minute and a temperature of 200° C. The reinforced sample was then mounted on a 6 inch diameter wooden embroidery hoop. A solution was prepared consisting of the following: 95% by volume NR-50, containing 5% by weight perfluorosulfonic acid/TFE copolymer resin in a solvent mixture of less than 25% water, preferably 16–18% water, and the remainder a mixture of isopropanol and normal propanol; and 5% of Triton X-100 non-ionic surfactant. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the ion exchange material/surfactant solution was applied. The wet membrane was dried in the oven at 140 C. for 30 seconds, then soaked in isopropanol for 2 minutes. Finally, the membrane was boiled in distilled water for 5 minutes.

Example 8

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution was prepared consisting of the following: 95% NR-50, containing 5% by weight perfluorosulfonic acid/TFE copolymer resin in a solvent mixture of less than 25% water, preferably 16–18% water, and the remainder a mixture being isopropanol and normal propanol; and 5% of Triton X-100 non-ionic surfactant. The solution was brushed on both sides of the membrane with a foam brush and the excess was wiped off. The wet membrane was dried in an oven at 140° C. for 30 seconds. Three additional coats of solution were applied to the membrane in the same manner. The membrane was then soaked in isopropanol for 2 minutes to remove the surfactant. The membrane was rinsed with distilled water and allowed to dry at room temperature. A final treatment of the solution was applied. The wet membrane was dried in the oven at 140° C. for 30 seconds, then soaked in isopropanol for 2 minutes. Finally, the membrane was boiled in distilled water for 5 minutes.

Example 9

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. The membrane was first submerged in a solution consisting of 25% Triton X-100 non-ionic surfactant, 25% water, and 50% isopropyl alcohol. Next, a solution of NR-50 was brushed on both sides of the membrane with a foam brush and the excess was wiped off. The wet membrane was dried in an oven at 140° C. for 30 seconds. Three additional coats of surfactant solution followed by a coat of NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the ion exchange material/surfactant was applied to the membrane. The wet membrane was dried in the oven at 140° C. for 30 seconds, then soaked in isopropanol for 2 minutes. Finally, the membrane was boiled in distilled water for 5 minutes.

Example 10

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. The membrane was first submerged in a solution consisting of 25% Triton X-100 non-ionic surfactant, 25% water, and 50% isopropyl alcohol. Next, a 95% by weight NR-50 solution, containing 5% by weight perfluorosulfonic acid/TFE copolymer resin in a solvent mixture of less than 25% water, preferably 16–18% water, and the remainder a mixture of isopropanol and normal propanol, was brushed on both sides of the membrane with a foam brush and the excess was wiped off. The wet membrane was dried in an oven at 140° C. for 30 seconds. Three additional coats of surfactant solution followed by the NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the NR-50 solution was applied. The wet membrane was dried in the oven at 140° C. for 30 seconds, then soaked in isopropanol for 2 minutes. Finally, the membrane was boiled in distilled water for 5 minutes.

Example 11

A TYPE 1 ePTFE membrane, having a nominal thickness of 0.75 mils (0.02 mm) and a Gurley Densometer air flow of 2–4 seconds, was placed on top of a netting of polypropylene. The two materials were bonded together on a laminator with 10 psig pressure, a speed of 15 feet per minute and a temperature of 200° C. The reinforced sample was then mounted on a 6 inch diameter wooden embroidery hoop. The membrane was first submerged in a solution consisting of 25% Triton X-100 non-ionic surfactant, 25% water, and 50% isopropyl alcohol. Next, a solution of NR-50 was brushed on both sides of the membrane with a foam brush and the excess was wiped off. The wet membrane was dried in an oven at 140° C. for 30 seconds. Three additional coats of the surfactant solution followed by the NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the NR-50 solution was applied. The wet membrane was dried in the oven at 140° C. for 30 seconds, then soaked in isopropanol for 2 minutes. Finally, the membrane was boiled in distilled water for 5 minutes.

Example 12

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin in a solvent mixture of less than 25% water, preferably 16–18% water, and the remainder a mixture of isopropanol and normal propanol was allowed to evaporate slowly at room temperature. The resulting resin was ground to a powder with a mortar and pestle. This resin was then dissolved in methanol under low heat (less than 70° C.). The final solution contained the original resin content in a base solvent of methanol such that the resin content of the solution was 5% by weight. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was boiled in distilled water for 5 minutes.

Example 13

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin, in a solvent mixture of less than 25% water, preferably 16–18% water, and the remainder a mixture of isopropanol and normal propanol, was allowed to evaporate slowly at room temperature. The resulting resin was ground to a powder with a mortar and pestle. This resin was then dissolved in methanol under low heat (less than 70° C.). The final solution contained the original resin content in a base solvent of methanol such that the resin content of the solution was 5% by weight. This solution was used to prepare a new solution comprised of a 95% dewatered resin solution, and 5% Triton X-100 non-ionic surfactant. The solution was brushed on both sides of the membrane with a foam brush and the excess was wiped off. The wet membrane was dried in an oven at 140° C. for 30 seconds. Two additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the resin/Triton X-100 non-ionic surfactant solution was applied. The wet membrane was dried in the oven at 140° C. for 30 seconds, then soaked in isopropanol for 2 minutes. Finally, the membrane was boiled in distilled water for 5 minutes.

Example 14

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin in a solvent mixture of less than 25% water, preferably 16–18% water, and the remainder a mixture of isopropanol and normal propanol, was allowed to partially evaporate slowly at room temperature. Before all the solvent evaporated, the viscous liquid was mixed with methanol. The water content of the resulting solution was estimated at 5%. The resin content of the solution was 5%. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was boiled in distilled water for 5 minutes.

Example 15

A TYPE 1 ePTFE membrane, having a nominal thickness of 0.75 mils (0.02 mm) and a Gurley Densometer air flow of 2–4 seconds, was placed on top of a netting of polypropylene. The two materials were bonded together on a laminator with 10 psig pressure, a speed of 15 feet per minute and a temperature of 200° C. The reinforced sample was then mounted on a 6 inch diameter wooden embroidery hoop. A solution consisting of 5% by weight of perfluorosulfonic acid/TFE copolymer resin in a solvent mixture of less than 25% water, preferably 16–18% water and the remainder a mixture of isopropanol and normal propanol, was allowed to partially evaporate slowly at room temperature. Before all the solvent evaporated, the viscous liquid was mixed with methanol. The water content of the resulting solution was estimated at 5%. The resin content of the solution was 5%. The solution was brushed on both sides of the membrane with a foam brush and the excess was wiped off. The wet membrane was dried in an oven at 140° C. for 30 seconds.

Three additional coats of solution were applied to the membrane in the same manner to fully occlude the interior volume of the membrane. The membrane was boiled in distilled water for 5 minutes.

Example 16

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin in a solvent mixture of less than 25% water, preferably 16–18% water and the remainder a mixture of isopropanol and normal propanol, was allowed to partially evaporate slowly at room temperature. Before all the solvent evaporated, the viscous liquid was mixed with methanol. The water content of the resulting solution was estimated at 5% The resin content of the solution was 5%. This solution was used to prepare a new solution comprised of 95% of the low-water resin solution, and 5% of the nonionic surfactant, Triton X-100. The new solution was brushed on both sides of the membrane with a foam brush and the excess was wiped off. The wet membrane was dried in an oven at 140° C. for 30 seconds. Two additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the new solution was applied. The wet membrane was dried in the oven at 140° C. for 30 seconds, then soaked in isopropanol for 2 minutes. Finally, the membrane was boiled in distilled water for 5 minutes.

Example 17

A thermoplastic frame was cut and a membrane of ePTFE was placed at a center location of the frame. The ePTFE membrane was heat sealed to the frame. The membrane was then treated in accordance with Example 1. Alternatively, a fluoroionomer membrane made in accordance with Example 1 was secured mechanically within a frame.

This "framed" fluoroionomer composite has utility, by providing a unitary construction which can be placed in a device, which beyond serving as an ion exchange medium, can also serve as a sealant between various components of a cell assembly.

Example 18

TEFLON® fine powder was blended with ISOPAR K mineral spirit at a rate of 115 cc per pound of fine powder. The lubricated powder was compressed into a cylinder and was ram extruded at 70° C. to provide a tape. The tape was split into two rolls, layered together and compressed between rolls to a thickness of 0.030 inch. Next, the tape was stretched transversely to 2.6 times its original width. The ISOPAR K was driven off by heating to 210° C. The dry tape was expanded longitudinally between banks of rolls in a heat zone heated to 300° C. The ratio of speed of the second bank of rolls to the first bank of rolls was 35:1 and the third bank of rolls to the second bank of rolls was 1.5:1, for a total of 52:1 longitudinal expansion producing a tape having a width of 3.5 inches. This tape was heated to 295° C. and transversely expanded 13.7 times in width, while being constrained from shrinkage and then heated to 365° C. while still constrained. This process produced a web-like membrane having a porous microstructure composed substantially of fibrils in which no nodes were present Example 19

An ePTFE membrane, having a nominal thickness of 2.2 mils (0.6 mm) and a Gurley Densometer air flow of 6–9 seconds, was mounted on a 6 inch diameter wooden embroidery hoop. A solution consisting of 5% by weight of ionomer, such as perfluorosulfonic acid/TFE copolymer resin in a solvent such as methanol, was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane.

Example 20

An ePTFE membrane, having a nominal thickness of 3 mils (0.8 mm) and a Gurley Densometer air flow of 6–9 seconds, was mounted on a 6 inch diameter wooden embroidery hoop. A solution consisting of 5% by weight of ionomer, such as perfluorosulfonic acid/TFE copolymer resin in a solvent such as methanol, was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane.

Example 21

An ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of ionomer, such as perfluorosulfonic acid/TFE copolymer resin of 1100 EW in a solvent such as methanol, was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. A second composite membrane prepared in the same manner, however using a 950 EW perfluorosulfonic acid/TFE copolymer in a solvent such as ethanol. The two membranes were then combined (laminated) by use of heat and pressure. For example, at 190° C. (375° F.) @100 psi for 1 minute in a heated press or a comparable arrangement in a heated roll.

Example 22

An ePTFE membrane, having a nominal thickness of 0.75 mils (0.002 mm) and a Gurley Densometer air flow of 2–4 seconds, was mounted on a 6 inch diameter wooden embroidery hoop. An alcohol solution consisting of 5% by weight of ionomer, and a finely divided powder, such as carbon black (10%), was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The final composite had a dark appearance.

Example 23

An ePTFE membrane, having a nominal thickness of 0.75 mils (0.002 mm) and a Gurley Densometer air flow of 2–4 seconds, was mounted on a 6 inch diameter wooden embroidery hoop. A solution consisting of 5% by weight of ionomer, was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. This composite membrane was then combined (laminated) to another ePTFE membrane having a nominal thickness of 0.75 (0.002) mm and a Gurley Densometer air flow of 2–4 second, by use of heat and pressure (for example 190 C. [375 F.] @100 psi) using a heated press or a comparable arrangement.

A solution consisting of 5% by weight of ionomer, such as perfluorosulfonic acid/TFE copolymer resin in a solvent such as methanol, was brushed on the ePTFE membrane side of the membrane with a foam brush and the excess was wiped off. The wet membrane was dried in an oven at 140° C. for 30 seconds. Three additional coats of solution were applied to the membrane in the same manner to fully occlude the interior volume of the ePTFE membrane. A thicker integral composite membrane was thus formed.

Comparative Samples

NAFION 117, a perfluorosulfonic acid cation exchange membrane, unreinforced film of 1100 equivalent weight commercially available from E. I. DuPont de Nemours Co., Inc., having a quoted nominal thickness of 7 mils (0.18 mm) was obtained. The samples, originally in the hydrated swollen state, were measured in the x- and y-directions and weighed.

Without intending to limit the scope of the present invention, data collected from testing the ion exchange membranes made in accordance with the procedures of the foregoing examples are summarized in the following tables. As may be appreciated by one skilled in the art, these tables reveal that the ion exchange membrane of this invention has superior ionic conductance and exceptional dimensional stability compared to known ion exchange membranes. Furthermore, this inventive membrane has good mechanical strength in the unswollen state and retains much of its mechanical strength in the swollen state, whereas conventional membranes are substantially weakened upon hydration.

TABLE 1

Moisture Vapor Transmission Rates (MVTR)

| Sample ID* | MVTR (grams/m$^2$-24 hrs.) |
|---|---|
| 4 | 25,040 |
| NAFION 117 | 23,608 |

*Measurements were obtained on samples in their swollen state.

TABLE 2

Tensile Test

| Sample ID | (Avg) Normalized Stress @ Max Load (psi) M-Dir | XM-Dir |
|---|---|---|
| Example 1 | 4706 | 2571 |
| NAFION 117* | 2308 | 1572 |
| Example 6 | 4988 | 3463 |
| NAFION 117** | 4314 | 3581 |

*sample was boiled in distilled water for 30 minutes.
**sample was tested as received from E. I. DuPont de Nemours, Inc.

TABLE 3

Gurley Numbers

| Sample ID | Thickness (mm)* | Base Material Gurley No. (sec) | Final Swollen Membrane Gurley Number (sec) |
|---|---|---|---|
| 1 | 0.02 | 2–4 | Total occlusion |
| 2 | 0.02 | 2–4 | Total occlusion |
| 3 | 0.01 | 2–4 | Total occlusion |

*Thickness measurements were obtained on samples prior to swelling in dried state.

TABLE 4

Ionic Conductance

| Sample ID | Ionic Conductance (mhos/sq. cm) |
|---|---|
| Example 1 | 22.7 |
| NAFION 117* | 7.0 |
| Example 5 | 8.5 |
| NAFION 117** | 4.7 |

*sample was boiled in distilled water for 30 minutes.
**sample was tested as received from E. I. DuPont de Nemours, Inc.

TABLE 5

Weight Loss With Temperature

| Sample ID | Final Weight (% of Orig. Wt. @ 100° C.) |
|---|---|
| Example 1 | 72 |
| NAFION 117* | 75 |
| Example 6 | 98 |
| NAFION 117** | 98 |

*sample was boiled in distilled water for 30 minutes.
**sample was tested as received from E. I. DuPont de Nemours, Inc.

TABLE 6

Selectivity

| Sample ID | Selectivity (millivolts) |
|---|---|
| NAFION 117, dry | 16.3 |
| NAFION 117, boiled | 10.8 |
| Example 1, boiled | 3.8 |
| Example 2, dry | 15.7 |

TABLE 7

| | Transverse Direction | Machine Direction |
|---|---|---|
| Example 1 | 2.95% | 2.90% |
| NAFION 117 | 11.80% | 10.55% |

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A*n* electrode apparatus adapted for use in an electrochemical system, the electrode apparatus comprising *composite membrane comprising*:

(a) [an] *at least one* expanded polytetrafluoroethylene membrane having a porous microstructure of polymeric fibrils *and having a thickness of 80 microns or less*; and (b) [an] *at least one* ion exchange material impregnated throughout the *porous microstructure of the expanded polytetrafluoroethylene* membrane *so as to render an interior volume of the expanded polytetrafluoroethylene membrane substantially occlusive*, the impregnated expanded polytetrafluoroethylene membrane having a Gurley number of greater than 10,000 seconds[, wherein the ion exchange material substantially impregnates the membrane so as to render an interior volume of the membrane substantially occlusive].

2. The electrode apparatus of claim 1, wherein the *expanded polytetrafluoroethylene* membrane [is expanded polytetrafluoroethylene having] *has* a microstructure defined by nodes interconnected by fibrils.

3. The electrode apparatus of claim 1, wherein the total thickness of the *expanded polytetrafluoroethylene* membrane is less than 13 [μm] *microns*.

4. The electrode apparatus of claim 1, wherein the electrochemical system is a fuel cell.

5. The electrode apparatus of claim 1, wherein the electrochemical system is an electrodialysis system.

*6. The electrode apparatus of claim 1, wherein the thickness of the expanded polytetrafluoroethylene membrane is 60 microns or less.*

*7. The electrode apparatus of claim 1, wherein the thickness of the expanded polytetrafluoroethylene membrane is 40 microns or less.*

*8. The electrode apparatus of claim 1, wherein the thickness of the expanded polytetrafluoroethylene membrane is 20 microns or less.*

*9. The electrode apparatus of claim 1, wherein the thickness of the expanded polytetrafluoroethylene membrane is at least 1.5 microns.*

*10. The electrode apparatus of claim 1, wherein the at least one ion exchange material is complimented by powder, non-ionic polymer, or a combination thereof.*

*11. The electrode apparatus of claim 10, wherein the at least one ion exchange material is complimented by silica.*

*12. The electrode apparatus of claim 10, wherein the at least one ion exchange material is complimented by platinum.*

*13. An electrode apparatus adapted for use in an electrochemical system, the electrode apparatus comprising a composite membrane consisting essentially of:*

*(a) at least one expanded polytetrafluoroethylene membrane having a porous microstructure of polymeric fibrils and having a thickness of 80 microns or less; and*

*(b) at least one ion exchange material impregnated throughout the porous microstructure of the expanded polytetrafluoroethylene membrane so as to render an interior volume of the expanded polytetrafluoroethylene membrane substantially occlusive, the impregnated expanded polytetrafluoroethylene membrane having a Gurley number of greater than 10,000 seconds.*

*14. The electrode apparatus of claim 13, wherein the expanded polytetrafluoroethylene membrane has a microstructure defined by nodes interconnected by fibrils.*

*15. The electrode apparatus of claim 13, wherein the thickness of the expanded polytetrafluoroethylene membrane is less than 25 microns.*

*16. The electrode apparatus of claim 13, wherein the electrochemical system is a fuel cell.*

*17. The electrode apparatus of claim 13, wherein the electrochemical system is an electrodialysis system.*

*18. The electrode apparatus of claim 13, wherein the at least one ion exchange material is complimented by silica.*

*19. The electrode apparatus of claim 13, wherein the at least one ion exchange material is complimented by platinum.*

*20. An electrode apparatus comprising:*

*(a) at least one porous polymeric membrane having a microstructure of micropores with a porosity of greater than 35% and a thickness of at most 25 microns; and*

*(b) at least one perfluoro ion exchange material impregnated within the micropores of the polymeric membrane so as to render them substantially occlusive.*

*21. The electrode apparatus according to claim 20, wherein the thickness is at most 20 microns.*

*22. The electrode apparatus according to claim 20, wherein the porosity is greater than 70%.*

*23. An electrode apparatus according to claim 20, wherein the perfluoro ion exchange material is locked inside the membrane which prevents the material from migrating to the surface during drying of the impregnated perfluoro ion exchange material.*

*24. An electrode apparatus according to claim 20, wherein the thickness is at most 6 microns.*

*25. An electrode apparatus comprising:*

*an ultra-thin composite membrane comprising:*

*(a) at least oneporous polymeric membrane having a microstructure of micropores with a porosity of greater than 35% and a thickness of at most 25 microns; and*

*(b) at least one perfluoro ion exchange material fully impregnated within the micropores of the polymeric membrane so as to render them fully occlusive, wherein the composite membrane is air impermeable with a Gurley number of greater than 10,000 seconds.*

*26. An electrode apparatus according to claim 25, wherein the thickness is at most 20 microns.*

*27. An electrode apparatus according to claim 25, wherein the thickness is at most 6 microns.*

*28. An electrode apparatus according to claim 25, wherein the porosity is greater than 70%.*

*29. An electrode apparatus according to claim 25, wherein the composite membrane is heated at 60° C. to 200° C.*

*30. A fuel cell comprising a composite membrane located between an anode and a cathode, the composite membrane comprising:*

*(a) at least one porous polymeric membrane having a microstructure of micropores with a porosity of greater than 35% and a thickness of at most 25 microns; and*

*(b) at least one perfluoro ion exchange material impregnated within the micropores of the polymeric membrane so as to render them substantially occlusive.*

*31. A fuel cell according to claim 30, wherein the porosity is greater than 70%.*

*32. A fuel cell according to claim 30, wherein the composite membrane is heated at 60° C. to 200° C.*

*33. A fuel cell according to claim 30, wherein the composite membrane is heated so as to lock the perfluoro ion exchange material inside the membrane.*

*34. A fuel cell according to claim 30, wherein the thickness is at most 20 microns.*

35. A fuel cell according to claim 30, wherein the thickness is at most 13 microns.

36. A fuel cell comprising a composite membrane located between an anode and a cathode, the composite membrane comprising:

(a) at least oneporous polymeric membrane having a microstructure of micropores with a porosity of greater than 35% and a thickness of at most 25 microns; and (b) at least one perfluoro ion exchange material fully impregnated within the micropores of the polymeric membrane, wherein the composite membrane is air impermeable with a Gurley number of greater than 10,000 seconds.

37. A fuel cell according to claim 36, wherein the porosity is greater than 70%.

38. A fuel cell according to claim 36, wherein the ion exchange material is locked within the composite membrane.

39. A fuel cell according to claim 37, wherein the ion exchange material is locked within the composite membrane.

40. A fuel cell according to claim 36, wherein the thickness is at most 20 microns.

41. An electrode apparatus comprising:

(a) at least one expanded polytetrafluoroethylene membrane having a porous microstructure of polymeric fibrils and a total thickness of less than 20 microns; and (b) at least one ion exchange material impregnated throughout the membrane, the impregnated expanded polytetrafluoroethylene membrane having a Gurley number of greater than 10,000 seconds, wherein the ion exchange material substantially impregnates the membrane to render an interior volume of the membrane substantially occlusive.

42. A electrode apparatus according to claim 41, wherein the porosity of the expanded polytetrafluoroethylene membrane is greater than 70%.

43. A electrode apparatus according to claim 41, wherein the perfluoro ion exchange material is locked inside the membrane.

44. A electrode apparatus according to claim 41, wherein the impregnated membrane is heated at 120° C. to 160° C.

45. A electrode apparatus according to claim 41, wherein the total thickness is at most 13 microns.

46. A fuel cell comprising a composite membrane located between an anode and a cathode, the composite membrane comprising:

(a) at least one expanded polytetrafluoroethylene membrane having a porous microstructure of polymeric fibrils and a total thickness of less than 20 microns; and (b) at least one ion exchange material impregnated throughout the membrane, the impregnated expanded polytetrafluoroethylene membrane having a Gurley number of greater than 10,000 seconds, wherein the ion exchange material substantially impregnates the membrane to render an interior volume of the membrane substantially occlusive.

47. A fuel cell according to claim 46, wherein the porosity of the expanded polytetrafluoroethylene membrane is greater than 70%.

48. A fuel cell according to claim 46, wherein the composite membrane is heated at 60° C. to 200° C.

49. A fuel cell according to claim 46, wherein the composite membrane is heated at 120° C. to 160° C.

50. A fuel cell according to claim 46, wherein the total thickness is at most 13 microns.

51. An electrode apparatus comprising a laminate of composite membranes consisting essentially of at least two composite membranes laminated to each other, wherein the at least two composite membranes each consist essentially of:

(a) at least one expanded polytetrafluoroethylene membrane having a porous microstructure of polymeric fibrils and having a thickness of 80 microns or less; and (b) at least one ion exchange material impregnated throughout the porous microstructure of the membrane so as to render an interior volume of the expanded polytetrafluoroethylene membrane substantially occlusive, the impregnated membrane having a Gurley number of greater than 10,000 seconds.

52. An electrode apparatus according to claim 51, wherein the thickness of the laminate is 40 microns or less.

53. An electrode apparatus according to claim 51, wherein at least two of the impregnated membranes are impregnated with ion exchange material before lamination to form the laminate.

54. An electrode apparatus according to claim 51, wherein the laminate is prepared by the combination of steps comprising:

(i) impregnation of at least one first unimpregnated expanded polytetrafluoroethylene membrane with ion exchange material to form a first impregnated membrane, (ii) lamination of the first impregnated membrane with a second unimpregnated expanded polytetrafluoroethylene membrane, and (iii) impregnation of the second unimpregnated expanded polytetrafluoroethylene to form a second impregnated membrane which is laminated to the first impregnated membrane.

55. An electrode apparatus according to claim 51, wherein lamination is carried out by heat.

56. An electrode apparatus according to claim 51, wherein each of the impregnated polytetrafluoroethylene membranes have been heated to a temperature of at least 60° C. and each of the impregnated membranes have an ionic conductance of at least 22.7 mhos/cm$^2$; wherein the thickness of each of the impregnated membranes is 20 microns or less; wherein the ion exchange material is perfluorinated sulfonic acid resin; wherein each of the impregnated membranes are prepared by multiple impregnations of two sides of the expanded polytetrafluoroethylene membrane with ion exchange material.

57. An electrode apparatus according to claim 56, wherein the thickness of the laminate is 40 microns or less.

58. A fuel cell comprising a laminate membrane consisting essentially of at least two composite membranes laminated to each other, wherein each of the composite membranes are prepared by a combination of steps consisting essentially of:

providing at least one microporous expanded polytetrafluoroethylene membrane having a thickness of 80 microns or less;

impregnating the microporous membrane with ion exchange material so the impregnated membrane has a Gurley number of at least 10,000 seconds;

heating the impregnated membrane to between 60° C. and 200° C.

59. A fuel cell according to claim 58, wherein the thickness of the laminate membrane is 60 microns or less.

60. A fuel cell according to claim 58, wherein the thickness of the laminate membrane is 40 microns or less.

*61. A fuel cell according to claim 58, wherein the thickness of the laminate membrane is 20 microns or less.*

*62. A fuel cell according to claim 58, wherein the laminate membrane has an ionic conductance of at least 8.5 mhos/cm$^2$.*

*63. A fuel cell according to claim 58, wherein the laminate membrane has an ionic conductance of at least 22.7 mhos/cm$^2$.*

*64. A method for preparing an electrode apparatus comprising the step of:*

*locating at least one ion exchange membrane between an anode and a cathode, wherein the ion exchange membrane comprises*

*(a) at least one porous polymeric membrane having a microstructure of micropores with a porosity of greater than 35% and a thickness of at most 25 microns; and*

*(b) at least one perfluoro ion exchange material impregnated within the micropores of the polymeric membrane so as to render them substantially occlusive.*

*65. A method according to claim 64, wherein the thickness is at most 20 microns.*

*66. A method according to claim 64, wherein the thickness is at most 13 microns.*

*67. A method according to claim 64, wherein the thickness is at most 6 microns.*

*68. A method according to claim 64, wherein the electrode apparatus is a fuel cell.*

*69. A method according to claim 64, wherein the porosity is greater than 70%.*

*70. A method according to claim 69, wherein the thickness is at most 6 microns.*

* * * * *

Disclaimer and Dedication

RE 37,656 E — Bamdad Bahar, Elkton, MD (US); Robert S. Mallouk, Chadds Ford, PA (US); Alex R. Hobson, Elkton: Jeffrey A. Kolde, Baltimore, both of MD (US). ELECTRODE APPARATUS CONTAINING AN INTEGRAL COMPOSITE MEMBRANE, Patent dated Apr. 16, 2002. Disclaimer filed Mar. 17, 2006 by the Assignee, Gore Enterprise Holdings, Inc. ("Gore").

Disclaims and dedicates to the Public, claims 20-40 and 64-70, of said patent.

(*Official Gazette May 23, 2006*)